US010823303B2

(12) United States Patent
Bachofer

(10) Patent No.: US 10,823,303 B2
(45) Date of Patent: Nov. 3, 2020

(54) VALVE DEVICE

(71) Applicant: Mack & Schneider GmbH, Filderstadt (DE)

(72) Inventor: Steffen Bachofer, Filderstadt (DE)

(73) Assignee: MACK & SCHNEIDER GMBH, Filderstadt (DE)

( * ) Notice: Subject to any disclaimer, the term of this patent is extended or adjusted under 35 U.S.C. 154(b) by 0 days.

(21) Appl. No.: 16/073,859

(22) PCT Filed: Feb. 10, 2017

(86) PCT No.: PCT/EP2017/053040
§ 371 (c)(1),
(2) Date: Jul. 30, 2018

(87) PCT Pub. No.: WO2017/137582
PCT Pub. Date: Aug. 17, 2017

(65) Prior Publication Data
US 2019/0032805 A1    Jan. 31, 2019

(30) Foreign Application Priority Data

Feb. 10, 2016  (DE) .................. 10 2016 202 026

(51) Int. Cl.
*F16K 31/00*  (2006.01)
*F16K 1/44*  (2006.01)
(Continued)

(52) U.S. Cl.
CPC ............ *F16K 31/002* (2013.01); *F16K 1/443* (2013.01); *F16K 11/105* (2013.01);
(Continued)

(58) Field of Classification Search
CPC .... F16K 27/0263; F16K 31/002; F16K 1/443; F16K 11/105; G05D 23/026; F01P 2070/02
See application file for complete search history.

(56) References Cited

U.S. PATENT DOCUMENTS 2,719,518 A * 10/1955 Newman ................ F02M 13/08
123/557
3,118,648 A    1/1964 Campbell
(Continued)

FOREIGN PATENT DOCUMENTS

DE      3119313 A1 * 12/1982 .......... F16K 11/0782
DE      197 50 814 A1    6/1999
(Continued)

OTHER PUBLICATIONS

WO2009124766A2 (Year: 2009).*
(Continued)

*Primary Examiner* — Marc E Norman
*Assistant Examiner* — Schyler S Sanks
(74) *Attorney, Agent, or Firm* — Pearne & Gordon LLP

(57) ABSTRACT

A valve device for a cooling water system of a motor vehicle, with a housing including a first connection and a second connection for a first liquid circuit, and a third connection and a fourth connection for a second liquid circuit, wherein the first connection is permanently fluidically connected to the second connection, and with a valve unit including a movably mounted valve element with which a thermally activatable spring element is associated, and which opens a connection between the third connection and the fourth connection in a first end position and cuts off the connection in a second end position. The thermally activatable spring element is arranged in a chamber located between the first connection and the second connection, which is permanently cut off from the third and the fourth
(Continued)

connection and which preloads the valve element in the direction of the second end position.

20 Claims, 3 Drawing Sheets

(51) Int. Cl.
    *G05D 23/02* (2006.01)
    *F16K 27/02* (2006.01)
    *F16K 11/10* (2006.01)

(52) U.S. Cl.
    CPC ....... *F16K 27/0263* (2013.01); *G05D 23/026* (2013.01); *F01P 2070/02* (2013.01)

(56) References Cited

U.S. PATENT DOCUMENTS

| | | | | |
|---|---|---|---|---|
| 4,114,571 | A | * | 9/1978 | Ruf .......................... F01M 1/08 123/196 AB |
| 2009/0090415 | A1 | * | 4/2009 | Harris .................. F16K 27/003 137/7 |
| 2010/0126594 | A1 | | 5/2010 | Sheppard |
| 2015/0277453 | A1 | * | 10/2015 | Yajima .................. F16K 17/048 236/93 R |

FOREIGN PATENT DOCUMENTS

| | | |
|---|---|---|
| DE | 10 2005 061 476 A1 | 6/2007 |
| DE | 60 2004 004 250 T2 | 11/2007 |
| DE | 10 2013 225 098 A1 | 6/2015 |
| DE | 10 2014 213 938 B3 | 8/2015 |
| JP | 10-160037 A | 6/1998 |
| JP | 2009-121589 A | 6/2009 |
| WO | 03/071372 A1 | 8/2003 |
| WO | WO-2009124766 A2 * 10/2009 ........... G05B 23/026 |

OTHER PUBLICATIONS

DE3119313A1 English Translation (Year: 1982).*
International Search Report from Corresponding International Application No. PCT/EP2017/053040 dated Apr. 11, 2017.
Written Opinion from Corresponding International Application No. PCT/EP2017/053040 dated Apr. 11, 2017.

* cited by examiner

VALVE DEVICE

The invention relates to a valve device, in particular for a cooling water system of a motor vehicle, with a housing comprising a first connection and a second connection for a first liquid circuit, and a third connection and a fourth connection for a second liquid circuit, wherein the first connection is permanently fluidically connected to the second connection, and with a valve unit comprising a movably mounted valve element with which a thermally activatable spring element is associated, and which opens a connection between the third connection and the fourth connection in a first end position, and cuts off the connection in a second end position.

Valve devices of the type mentioned at the start are known from the prior art. Modern motor vehicles comprise multi-part cooling water systems which include two or more cooling water circuits which can be operated at least partially independently of one another. Thereby it is achieved, for example, that, when a combustion engine of the motor vehicle is cold started, at first only a small cooling water circuit is activated, guaranteeing that the operating temperature of the combustion engine is rapidly reached. It is only at a later time that an additional cooling water circuit is added, for example, in order to carry out a cooling of the cooling water, so that the operating temperature of the combustion engine does not exceed a critical value. Systems are also known, in which cooling water circuits are connected to one another in order to achieve an advantageous mixing and temperature control of the temperature of the cooling water.

Thus, for example, the unexamined patent application DE 10 2013 225 098 A1 discloses a valve device for a cooling water system which comprises two cooling water circuits. The valve device here comprises a connection channel between the two cooling water circuits, in which a valve unit is arranged. In a first operating state, the valve unit closes off one of the cooling water circuits and opens the connection channel, so that cooling water from one liquid circuit reaches the other liquid circuit. In its second operating state, the valve device closes off the connection channel and re-opens the one cooling water circuit, so that the two cooling water circuits work independently of one another. Here, a thermally activatable setting device in the form of a shape memory alloy spring is associated with a valve element of the valve device, and pushes the valve element into the second operating state when the element has reached its activation temperature.

The underlying aim of the invention is to create a valve device which can be implemented simply and cost effectively and which enables an improved liquid management.

The underlying aim of the invention is achieved in particular by the valve device having the features of Claim 1. Said valve device has the advantage that the first liquid circuit is permanently cut off from the second liquid circuit and that, when the spring element is thermally activated, the connection between the third connection and the fourth connection is cut off, without a connection with the first liquid circuit being established. For this purpose, it is provided according to the invention that the thermally activatable spring element is arranged in a chamber connected between the first connection and the second connection, which is permanently cut off from the third and from the fourth connection, and preloads the valve element in the direction of the second end position. Thereby, it is achieved that the first liquid circuit also furthermore is operated or can be operated independently of the second liquid circuit. Only the thermal energy contained in said first liquid circuit is used for actuating or switching the valve unit in order to influence the second liquid circuit. If the temperature in the chamber, that is to say the temperature of the liquid flowing from the first connection to the second connection or the other way round, increases in such a manner that it exceeds the activation temperature, then the thermally activatable spring element is activated and applies a spring force or pressure force to the valve element in the direction of the second end position, so that the third connection is cut off from the fourth connection, and the second liquid circuit is closed off. If the temperature in the first liquid circuit decreases, so that it falls below the deactivation temperature, then the thermally activatable spring element is deactivated again, so that the second cooling water circuit or liquid circuit can be opened again.

According to a preferred development of the invention, it is provided that a return spring on the valve element opposes the thermally activatable spring element. The return spring thus pushes the valve element against the force of the thermally activatable spring element into the first end position in which the second liquid circuit is opened. Thereby, a fully automated switching of the valve device as a function of the temperature of the liquid which flows from the first connection to the second connection or the other way round occurs.

Moreover, it is preferably provided that the valve unit is designed as a plug-in module. The valve unit is thus designed in such a manner that it can be plugged as a module into the housing of the valve device, in particular plugged in axially. This results in a particularly simple mounting of the valve device, which optionally also enables an adaptation of the valve device to different limiting conditions by means of differently designed or dimensioned plug-in modules.

Preferably, it is provided that the valve unit comprises a cylindrical module housing which has on one end a bottom with an opening, which delimits the chamber, wherein the valve element is slidably mounted in the module housing and led radially by means of a free end in a sealing/tight manner through the opening. In particular, the cylindrical module housing can be plugged axially into the housing, for the purpose of which the housing advantageously comprises a cylindrical recess for the valve unit. Here, in particular the first and the second connections, optionally also the third and the fourth connections, lead into the recess. The chamber, in which the thermally activatable spring element is arranged, is delimited on one side by the bottom of the module housing, wherein the valve element is also passed through said bottom, so that it lies by means of a free end outside of the chamber or outside of the module housing, in order to open or cut off the connection there between the third and the fourth connections. Since the valve element is led radially in a sealing/tight manner through the opening, the two liquid circuits are cut off reliably and permanently from one another. In addition, the opening thus forms a slide bearing for the valve element. Since the valve element is led through the bottom, it extends in particular also axially or coaxially relative to the module housing, whereby a simple insertion of the valve unit into the housing is ensured. The valve unit can thus be preassembled outside of the housing, which simplifies the overall assembly. A second slide bearing for the valve element is preferably formed by a cover which closes the chamber at the other end and which for this purpose is connected, in particular on the front side, to the module housing and/or to the housing by positive locking, in particular welded.

According to a preferred development of the invention, it is provided that the free end of the valve element supports a sealing body, the sealing body is designed to cooperate, in the second end position, with a valve seat of the housing, so that the connection between the third connection and the fourth connection is cut off. The sealing body thus lies, as already mentioned, outside of the module housing in the housing, that is to say in an area through which only the liquid of the second liquid circuit runs. The housing here comprises a valve seat which advantageously cooperates with the sealing body in order to reliably ensure the cutting off of the connection between the third and the fourth connections. Preferably, the sealing body is designed as a resiliently deformable sealing body, in particular as an elastomer body, wherein the sealing body and the valve seat preferably comprise mutually corresponding contours in order to ensure a particularly good and tight seat for the sealing body in/on the valve seat. Here it is provided in particular that the sealing body is designed conically at least in sections and that, in this section, it cooperates with the also conically designed valve seat.

According to a preferred development of the invention, it is provided moreover that the valve element comprises a radial projection in the area of the chamber and that the spring elements are supported axially on the radial projection. The return spring and the thermally activatable spring element are thus both arranged in the area of the chamber and cooperate with the valve element via the radial projection. The radial projection is thus in the end arranged between the two spring elements, so that the force for shifting the valve element in one or the other direction on the radial projection is introduced into the valve element.

Preferably, it is provided that the radial projection is formed by a support sleeve which is pushed onto the valve element and held axially on the valve element by positive and/or frictional locking. The valve element thus has a support sleeve which is held or stopped axially on the valve element by positive and/or frictional locking, in order to transfer the forces introduced by the spring elements to the valve element. Due to the two-part design, a simple and cost effective setup is made possible, wherein the mounting of the support sleeve on the valve element can be carried out without problem. According to an alternative embodiment which is may be more cost-intensive but easier to mount, the radial projection is designed to form a single piece with the valve element.

Moreover, it is preferably provided that the support sleeve comprises at least one radially inward protruding support projection which engages in a radial recess of the valve element. Due to the radially inwardly protruding support projection, a positive locking connection between support sleeve and valve element is provided. The support sleeve is here designed in particular to be resiliently deformable at least in sections, in order to ensure the pushing-on and catching of the support projections in the radial recess. It is also conceivable to increase the inner diameter of the support sleeve by heating the support sleeve in such a manner that it can be pushed more easily onto the valve element.

According to a preferred development of the invention, it is provided moreover that at least two openings formed in a shell wall of the module housing are associated with the chamber, wherein one of the openings is/can be associated with the first connection and the other of the openings is/can be associated with the second connection. By means of the openings, the inflow and outflow of the liquid from the first liquid circuit to the chamber are ensured in a simple manner. Advantageously, the openings are arranged in the shell wall in such a manner that, in the state of the module housing in which it is inserted in the housing, they are connected fluidically to the first or the second connection.

In order to ensure a simple mounting and guarantee a lasting operation, it is moreover preferably provided that the module housing and the housing comprise at least one positive locking anti-rotation means. The anti-rotation means for one thing ensures that, during the insertion, the module housing and the housing are oriented with respect to one another in such a manner that the openings are associated in each case with the first or the second connection, and also that this association does not change during operation of the valve device. Particularly preferably it is provided that, for this purpose, the module housing and the housing each comprise an outer or inner contour deviating from a circle and designed so that they correspond to one another. In particular, it is provided that the module housing comprises a radial recess or a radial projection which cooperates with positive locking, at least in the circumferential direction, with a radial recess of the housing corresponding to the projection, in order to prevent twisting of the module housing relative to the housing.

According to an advantageous development of the invention, it is provided moreover that the module housing comprises at least one slit-shaped recess in its shell wall, and that a holding element comprising a guide opening for the valve element is laterally inserted through the slit-shaped recess into the module housing, so that it is held axially by positive locking in particular in the slit-shaped recess and stopped axially in the module housing. Due to the advantageous holding element, a support projection in the interior of the module housing is thus provided, on which, for example, one of the spring elements can be axially supported. Due to the modular setup of the valve device, the holding element can already be mounted during the preassembly of the valve unit. Overall, this results in a simple and cost effective implementation of the valve device.

In particular, it is provided that the return spring is axially supported on the holding element. The holding element here is arranged on the side of the chamber facing the bottom, so that it is opposite the radial projection of the valve element. Thereby, the return spring between the holding element and the radial projection of the valve element can be or is arranged preloaded.

Moreover, it is preferably provided that, between the holding element and the bottom, a resiliently deformable sealing element, in particular a sealing ring, which is in contact radially with the valve element in a sealingly/tight manner, in particular is held preloaded. The sealing element ensures that the passage of the valve element through the bottom occurs in a liquid-tight manner, so that the two liquid circuits are reliably permanently cut off from one another. As sealing element, in particular as sealing ring, for example, a sealing ring having an X-shaped cross-section is present.

Moreover, it is preferably provided that, in the housing, the third connection lies in the movement direction of the valve element and the fourth connection lies perpendicularly thereto. Here, particularly preferably, the valve seat is also associated with the third connection, so that, when the valve element has been moved into the second end position, the sealing element cooperates axially with the valve seat and is pushed by the thermally activatable spring element against the valve seat.

The cooling water system according to the invention having the features of Claim 13 is characterized by the valve device according to the invention. This results in the already mentioned advantages. Additional advantages and preferred features and combinations of features result in particular from the above description and from the claims.

Below, the invention will be explained in further detail in reference to an embodiment example.

Figure 1:
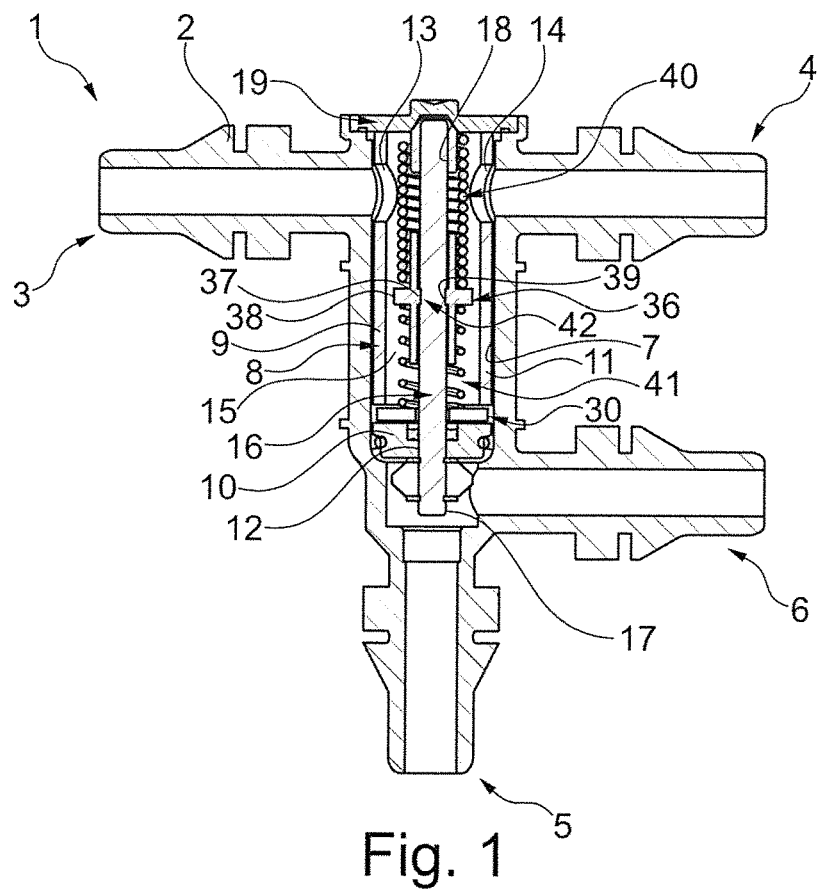
FIG. 1 shows an advantageous valve device in a cross-sectional representation.

FIG. 1 shows, in a longitudinal cross-sectional representation, a valve device 1 for a cooling water system of a motor vehicle which is not represented in further detail. The valve device 1 comprises a housing 2 which is designed so that it conveys liquid and which, for that purpose, comprises a first connection 3, a second connection 4, a third connection 5, and a fourth connection 6. The connections 3, 4, 5, 6 can each be connected to a liquid line of the cooling water system. Here, the cooling water system or the valve device is preferably designed in such a manner that the connections 3 and 4 are part of a first cooling water circuit, in particular a high-temperature circuit, of the cooling water system, and the connections 5 and 6 are part of a second cooling water circuit, in particular a low-temperature circuit, of the cooling water system.

The connections 3, 4 lie in the present case on the housing 2 on opposite sides in alignment with one another, and the connections 5 and 6 are arranged at right angles to one another in such a way that the connection 6 extends parallel to and spaced apart from the connections 3, 4, while the connection 5 is oriented perpendicularly thereto.

The housing 2 comprises a recess 7 which is of cylindrical design, wherein each of the connections 3, 4, 5, 6 leads into the recess 7, so that, by means of the recess 7, all the connections 3 to 6 are fluidically connected to one another. The recess 7 is designed here to be axially marginally open between the connections 3 and 4 in the housing 2.

In the recess 7, a valve unit 8 is inserted, which is designed as plug-in module and can accordingly be plugged axially into the recess 7. The valve unit 8 comprises a beaker-shaped module housing 9 which comprises a bottom 10 as well as a shell wall 11 starting from the bottom 10. The bottom 10 and the shell wall 11 here have an outer contour which corresponds at least substantially to the inner contour of the recess 7, so that the valve unit 8 is held at least substantially by positive locking in the recess 7 or in the housing 2. In the bottom 10, an opening 12 is formed in the center, and, in the shell wall 11, two mutually opposite openings 13 and 14 are formed. The openings 13, 14 are here each associated with one of the connections 3 and 4, in order to fluidically connect the chamber 15 located in the module housing 9 to the first hydraulic circuit or to the connections 3 and 4. For example, liquid flowing from the connection 3 to the connection 4 thus also flows through the chamber 15 or the inner space of the module housing 9.

In the module housing 9, a valve element 16 which is of rod-shaped design is mounted axially shiftably. Here, the valve element 16 is passed by means of a free end 17 through the opening 12 of the bottom 10, so that it protrudes on the side of the bottom 10 which is opposite the chamber 15. On the other end thereof, the valve element 16 is held axially in a guide recess 18 of a cover 19, which closes the module housing 9 on the side facing away from the bottom 10, and which moreover fastens the valve unit 8 to the housing 2. For this purpose, the cover 19 in the present case is welded at an outer margin thereof to the housing 2 with which it is in contact axially.

Figure 5:
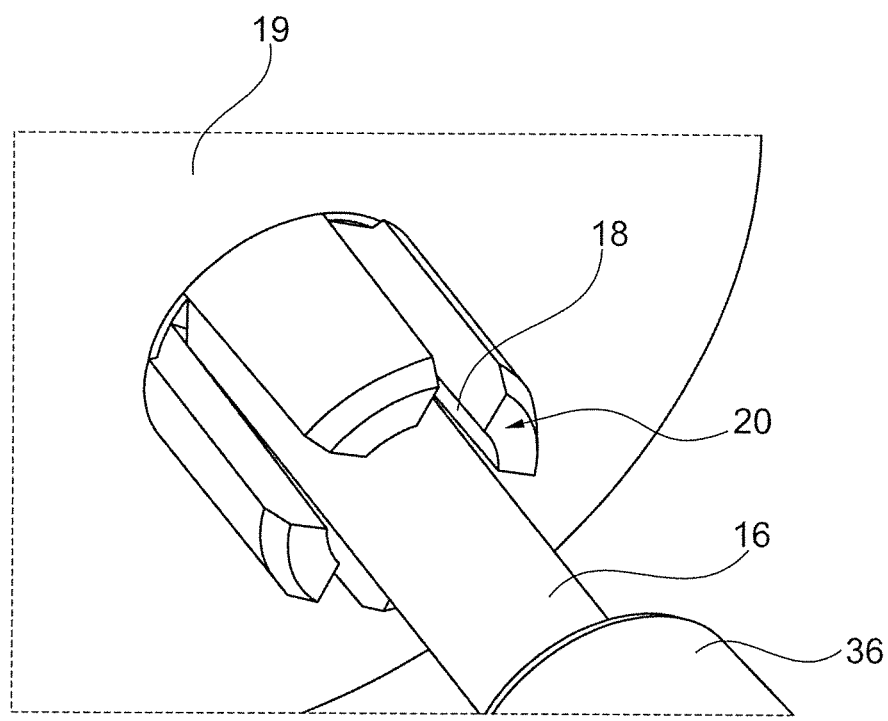
FIG. 5 shows an additional detail view of the valve device.

FIG. 5 shows, in a simplified perspective representation, a detail view of the guide recess 18. Said guide recess is designed as guide sleeve 20 which is designed as slit in longitudinal direction, or interrupted when viewed in the circumferential direction. The valve element 16 is held axially shiftably in the recess 18.

Figure 2:
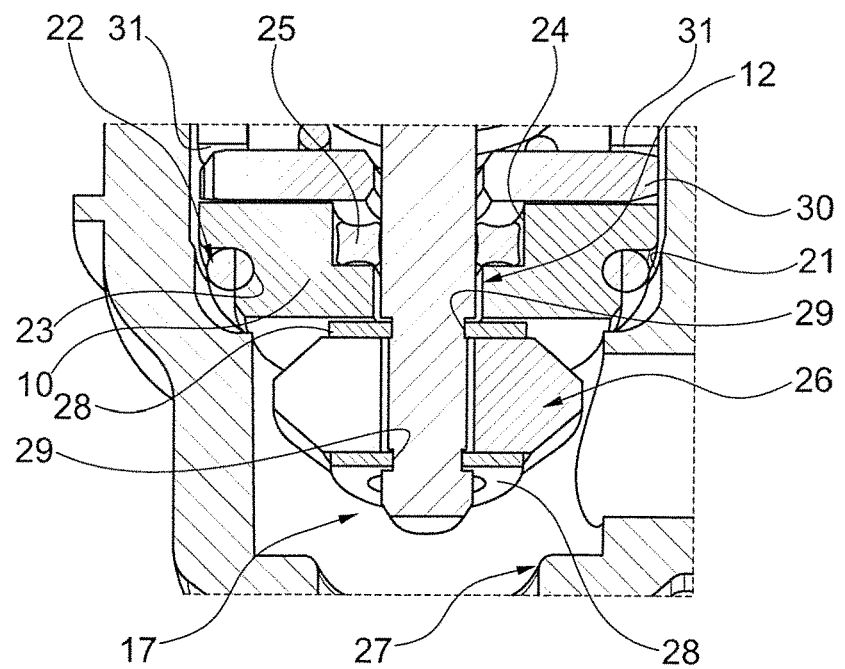
FIG. 2 shows a detail view of the valve device in a cross-sectional representation.

FIG. 2 shows an enlarged partial view of the valve device 1 in the area of the bottom 10. In the area of the bottom 10, the module housing 9 has a diameter narrowing in the form of a step 21. On this step 21, a sealing ring 22 is held in a radial recess 23 of the module housing 9, so that it is preloaded radially between the module housing 9 and the inner side of the housing 2 of the recess 7.

On the side of the bottom 10 facing the chamber 15, the bottom 10 moreover has an axial recess 24 which is formed coaxially relative to the opening 12. In this axial recess 24 lies a sealing element 25 in the form of a sealing ring having an X-shaped cross section. The sealing ring lies radially preloaded between one of the sides of the shell wall of the recess 24 and the outer shell wall of the valve element 16, so that the liquid of the first liquid circuit cannot flow past the module housing 9 or through the opening 12 to reach the second liquid circuit.

As can be seen in FIG. 2, on its free end 17, the valve element 16 supports, in addition, a sealing body 26 which is designed to be resiliently deformable. Since the sealing body 26 is arranged on the free end 17, it is located outside of the module housing 9 in the recess 7, namely in the present case in the area in which the connections 5 and 6 meet one another. Here, the sealing seat 27 is associated with the connection 5. The sealing element 26 and the sealing seat 27 are designed in such a manner that, when the valve element 16 has been moved or shifted in the direction of the connection 5, the sealing element 26 is pressed tightly on the sealing seat 27, in order to cut off the fluidic connection between the connection 5 and the connection 6. In order to hold the sealing element 26 axially on the valve element 16, it lies between two retaining rings or lock rings 28 which are held axially by positive locking on the valve element 16, in that they engage in annular grooves 29 provided there.

In order to prevent loosening of the seal between the valve element 16 and the module housing 9, which is formed by the sealing element 25, a holding element 30 is present, which will be explained in further detail in reference to FIGS. 3A and 3B.

Figure 3A:
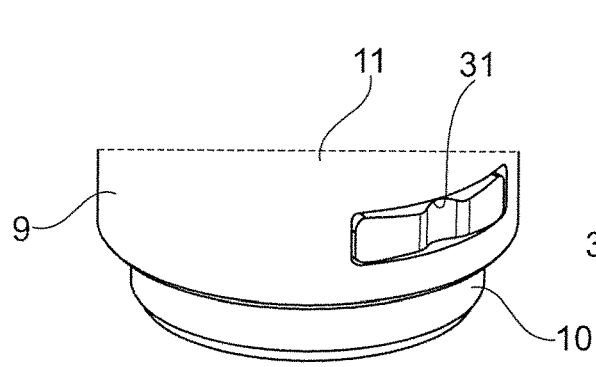
FIGS. 3A and 3B show a detail of the valve device in different views.
Figure 3B:
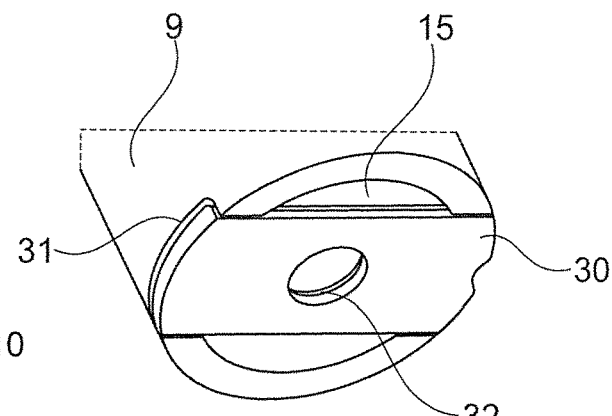

FIGS. 3A and 3B show a perspective top view onto the module housing (FIG. 3A) and a perspective cross-sectional representation of same (FIG. 3B). The holding element 30 is designed as a holding plate which has an outer contour on two opposite ends, which matches the outer contour of the module housing 9, so that the holding element 30 ends radially flush with the module housing 9. The module housing 9 comprises two mutually aligned slit-shaped recesses 31 for receiving the holding element, into which recesses the holding element 30 can be inserted, as shown in FIG. 3B. In the center, the holding element 30 has an opening 32, which has an inner diameter which is greater than the outer diameter of the valve element 16, so that said valve element can be led through the opening 32 by means of the free end 17, as shown in FIG. 2. The slit-shaped recesses 31 are here arranged in the vicinity of the bottom 10 in such a manner that the sealing element 25 is held axially between the bottom 10, on the one hand, and the holding element 30, on the other hand. Thereby, the loosening of seal between the valve element 16 and the module housing 9 can thus be prevented reliably.

Figure 4A:
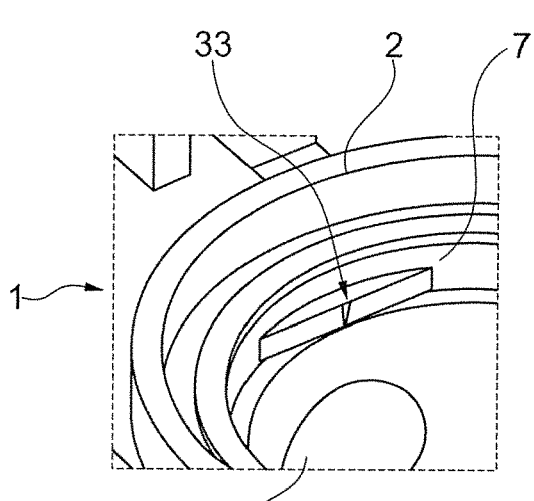
FIGS. 4A to 4C show an additional detail of the valve device in different views.
Figure 4B:
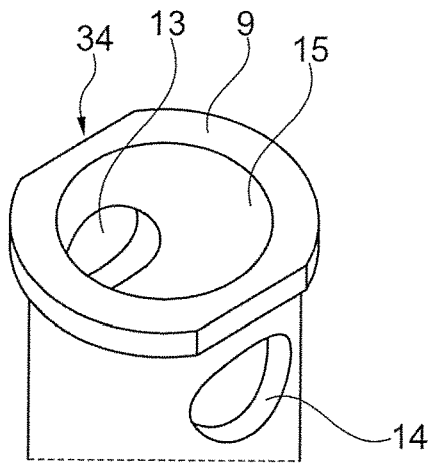
Figure 4C:
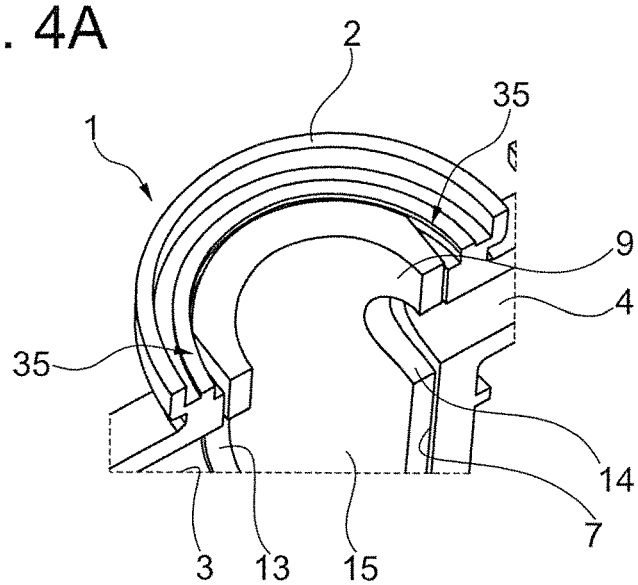

FIGS. 4A to 4C show an additional detail of the advantageous valve device 1, in several representations. FIG. 4A here shows a perspective top view onto the recess 7, FIG. 4B shows a perspective top view onto the module housing 9, and FIG. 4C shows a perspective top view onto the module housing 9 inserted in the recess 7.

According to FIG. 4A, the recess 7 comprises at least one inward pointing radial projection 33 which is designed to be complementary to a radial recess 34 of the module housing 9, as shown in FIG. 4B. In the present case, the radial recess 34 is formed by a flattening of the outer shell wall of the module housing 9. The recess 7 of the housing 2 has a projection 33 corresponding thereto. In the present case, in particular, two of the recesses 34 and projections 33 are arranged opposite one another, as can be seen in particular from FIGS. 4B and 4C. As can be seen in particular from FIG. 4C, the effect of the projection 33 and the respective recess 34 is that the module housing 9 comprises the recess 7 with in each case a contour deviating from a circle, which forms an anti-rotation means 35 between module housing 9 and housing 2. Due to this anti-rotation means 35, it is ensured that the openings 13, 14 are always associated in each case with the connections 3, 4, and thus a reliable operation of the valve device 1 or of the cooling water circuit/cooling water system comprising the valve device 1 is always maintained.

As can be seen moreover from FIG. 1, a valve sleeve 36 is pushed onto the valve element 16. When viewed axially, the valve sleeve 36 has in the center a radial projection 37 which protrudes radially inward, as well as a radial projection 38 which protrudes radially outward. The valve element 16 has an annular groove 39 which forms a radial recess 42, in which the radial projection 37 engages, so that the valve sleeve 36 is held axially by positive locking on the valve element 16.

The radial projection 38 is used as supporting projection which forms axial support surfaces for two spring elements 40 and 41. The two spring elements 40, 41 are designed as coil springs and are arranged coaxially relative to the valve element 16. The spring element 40 is supported here at one end on the cover 19 and at the other end on the radial projection 37, and the spring element 41 is supported at one end on the holding element 30 and at the other end on the radial projection 37. While the spring element 41 is a simple coil spring, the spring element 40 is designed as a thermally activatable spring element which is manufactured from a shape memory alloy. This results in the operation described below:

As long as the liquid conveyed by the connections 3 and 4 does not exceed a critical temperature or activation temperature, the spring element 41 pushes the valve element 16 in the direction of the cover 19, so that the sealing element 26 is removed from the valve seat 27 of the connection 5. However, if the temperature rises above the critical limit value, then the thermally activatable spring element 40 is activated, so that the spring force provided by the said spring element exceeds the spring force of the spring element 41. Thereby, the valve element 16 is shifted in the direction of the bottom 10, so that the sealing element 26 is pressed against the valve seat 27 and thereby closes or cuts off the connection between the connection 5 and the connection 6, so that the second liquid circuit is interrupted or stopped. Due to the advantageous seal by the sealing elements 25 and 22, it is ensured here that the liquid flowing between the connections 3 and 4 also moreover is supplied only to the first liquid circuit and does not reach the second liquid circuit. If the temperature of the liquid in the first liquid circuit drops below the or an additional limit value, then the shape memory alloy is deactivated again, so that the spring element 40 can be compressed by the spring force of the spring element 41, whereby the compressing of the valve element 16 is shifted in the direction of the cover 19 and thereby the sealing element 26 is removed from the seal seat 27, so that the second cooling circuit is opened again.

What is claimed is:

1. A valve device, comprising:
a main housing comprising a first connection and a second connection for a first liquid circuit, and a third connection and a fourth connection for a second liquid circuit, wherein the first connection is permanently fluidically connected to the second connection;
a valve unit comprising a movably mounted valve element being movable relative to the main housing between a first end position to open an interconnection between the third connection and the fourth connection and a second end position to cut off the interconnection between the third connection and the fourth connection; and
a thermally activatable spring element associated with the movably mounted valve element, wherein the thermally activatable spring element is arranged in a chamber located between the first connection and the second connection, wherein the chamber is permanently cut off from the third and the fourth connection, and wherein the thermally activatable spring element is configured to load the movably mounted valve element in the direction of the second end position,
wherein the valve unit is configured as a push-in module that is configured to be entirely pushed into the main housing,
wherein the valve unit further comprises a cylindrical module housing having at one end a bottom which delimits the chamber and the bottom having an opening, wherein the valve element is slidably mounted in the cylindrical module housing and is radially supported by means of a free end in a sealing manner through the opening, and
wherein at least two additional openings are formed in a shell wall of the cylindrical module housing and are associated with the chamber, wherein one of the additional openings is associated with the first connection and the other of the additional openings is associated with the second connection to fluidly interconnect the chamber along the first liquid circuit.

2. The valve device according to claim 1, wherein a return spring on the valve element opposes the thermally activatable spring element.

3. The valve device according claim 1, wherein the free end of the valve element supports a sealing body configured to cooperate in the second end position with a valve seat of the main housing to cut off the interconnection between the third connection and the fourth connection.

4. The valve device according to claim 1, wherein the valve element comprises at least one radial projection in the area of the chamber, and wherein the spring element is axially supported at the at least one radial projection.

5. The valve device according to claim 1, wherein the module housing and the main housing together comprise at least one positive locking anti-rotation means.

6. The valve device according to claim 4, wherein the at least one radial projection is defined by a support sleeve arranged on the valve element and which is held axially along the valve element by positive and/or frictional locking on the valve element.

7. The valve device according to claim 6, wherein the support sleeve comprises at least one radially inwardly protruding support projection which engages in a radial recess of the valve element to provide the axial location along the valve element.

8. The valve device according to claim 1, wherein the shell wall of the module housing comprises at least one slit-shaped recess, and wherein a holding element having an opening extends laterally through the slit-shaped recess into the module housing.

9. The valve device according to claim 8, wherein the return spring is axially supported on the holding element.

10. The valve device according to claim 8, wherein between the holding element and the bottom, a resiliently deformable sealing element is arranged in contact radially with the valve element in a sealing manner about the valve element.

11. The valve device according to claim 1, wherein in the housing, the third connection lies in the movement direction of the valve element and the fourth connection lies perpendicularly thereto.

12. A cooling water system for a motor vehicle, with a first liquid circuit and a second liquid circuit, and with a valve device which is associated both with the first liquid circuit and also with the second liquid circuit, wherein the design of the valve device is according to claim 1.

13. The valve device according to claim 9, wherein between the holding element and the bottom, a resiliently deformable sealing element is arranged in contact radially with the valve element in a sealing manner about the valve element.

14. The valve device according to claim 1, wherein the valve unit push-in module further is configured such that a full axial extent of the valve unit is axially pushable into the main housing absent rotation of the valve unit or the main housing relative to one another to effect a full receipt of the valve unit within the main housing.

15. A valve device, comprising:
a main housing comprising a first connection and a second connection for a first liquid circuit, and a third connection and a fourth connection for a second liquid circuit, wherein the first connection is permanently fluidically open to the second connection; and
a valve unit disposed within the main housing, wherein the valve unit comprises a cylindrical module housing, a movably mounted valve element axially movable within the cylindrical module housing, and a thermally activatable spring element disposed within a chamber of the cylindrical module housing,
wherein a full axial extent of the cylindrical module housing is axially translatable for receipt into the main housing absent rotation of the cylindrical module housing or the main housing relative to one another to effect a full receipt of the cylindrical module housing within the main housing,
wherein the movably mounted valve element is guided within the chamber for axial translation relative to the main housing to open and close an interconnection between the third connection and the fourth connection,
wherein at least two openings are formed in a shell wall of the cylindrical module housing with a first of the at least two openings being aligned with the first connection and a second of the at least two openings being aligned with the second connection to fluidly interconnect the chamber along the first liquid circuit between the first connection and the second connection, and
wherein the thermally activatable spring element is configured to load the movably mounted valve element in the direction of the second end position upon its thermal activation.

16. The valve device according to claim 15, wherein the chamber is permanently cut off from the third and the fourth connection within the main housing.

17. The valve device according to claim 15, wherein a return spring is disposed about the valve element and opposes the thermally activatable spring element.

18. The valve device according to claim 17, wherein the thermally activatable spring element and the return spring each are disposed within the cylindrical module housing.

19. The valve device according to claim 17, wherein a radial projection extends radially from the valve element and is axially located to separate the thermally activatable spring element and the return spring from one another.

20. The valve device according to claim 17, wherein each of the thermally activatable spring element and the return spring engage axially opposite sides of a radial projection extending from the valve element.

* * * * *